United States Patent [19]

Kawada et al.

[11] 4,370,614
[45] Jan. 25, 1983

[54] SPEED AND DIRECTION DETECTOR

[75] Inventors: Shigeki Kawada, Hino; Hiroshi Ishida, Hamuramachi, both of Japan

[73] Assignee: Fujitsu Fanuc Limited, Tokyo, Japan

[21] Appl. No.: 172,651

[22] Filed: Jul. 28, 1980

[30] Foreign Application Priority Data

Jul. 25, 1979 [JP] Japan .............................. 54/102600

[51] Int. Cl.³ .......................... G01P 3/48; G01P 3/54
[52] U.S. Cl. ................................... 324/173; 324/165
[58] Field of Search ....................... 324/174, 173, 165

[56] References Cited

U.S. PATENT DOCUMENTS 3,437,956  4/1969  Davis ............................ 324/173 X
3,728,565  4/1973  O'Callaghan ................... 324/173 X

FOREIGN PATENT DOCUMENTS 305935  5/1955  Switzerland ..................... 324/165

OTHER PUBLICATIONS

Crisp, Direction and Speed Detection Circuit, IBM Technical Disclosure Bulletin, vol. 15, No. 4, Sep. 1972, pp. 1198 & 1199.

Primary Examiner—Stanley T. Krawczewicz
Attorney, Agent, or Firm—Staas & Halsey

[57] ABSTRACT

A speed detector including a circular rotational member having a plurality of equally spaced-apart teeth on the outer circumference thereof, and first and second magnetic sensors. The first and second magnetic sensors each comprise a permanent magnet, a magnetic pole which permits the passage therethrough of a magnetic flux generated by the permanent magnet, and a detection coil wound on a portion of the magnetic pole. The magnetic poles of the first and second magnetic sensors are disposed in close proximity to, and arranged to face, the teeth on the rotational member, whereby each magnetic sensor produces an alternating output signal as the rotational member rotates, the frequency of each output signal being proportional to the speed of the rotational member. The direction in which the rotational member rotates can be detected by disposing the magnetic poles of the first and second magnetic detectors such that one of them is displaced circumferentially with respect to the other by an angular distance which is equivalent to ¼ of the pitch of the teeth arrayed on the rotational member.

4 Claims, 11 Drawing Figures

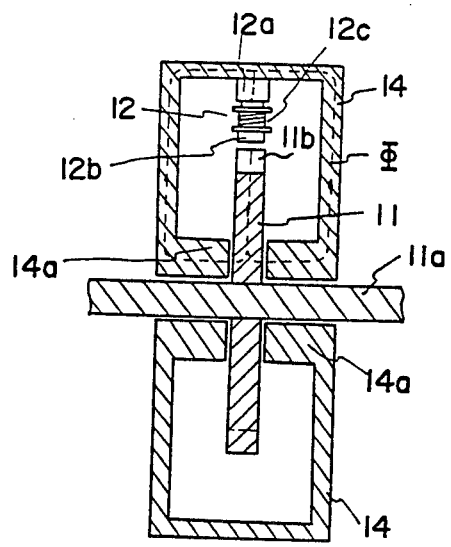
Fig. 4
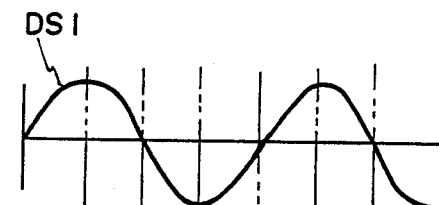
Fig. 5A
Fig. 5B
Fig. 5C

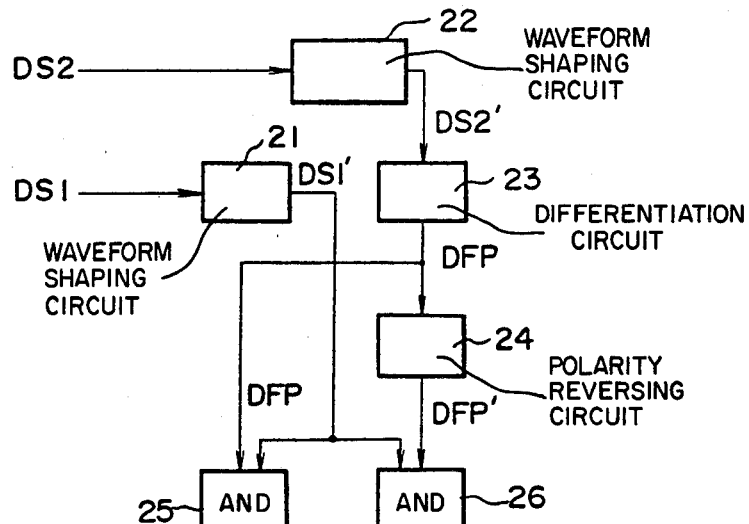
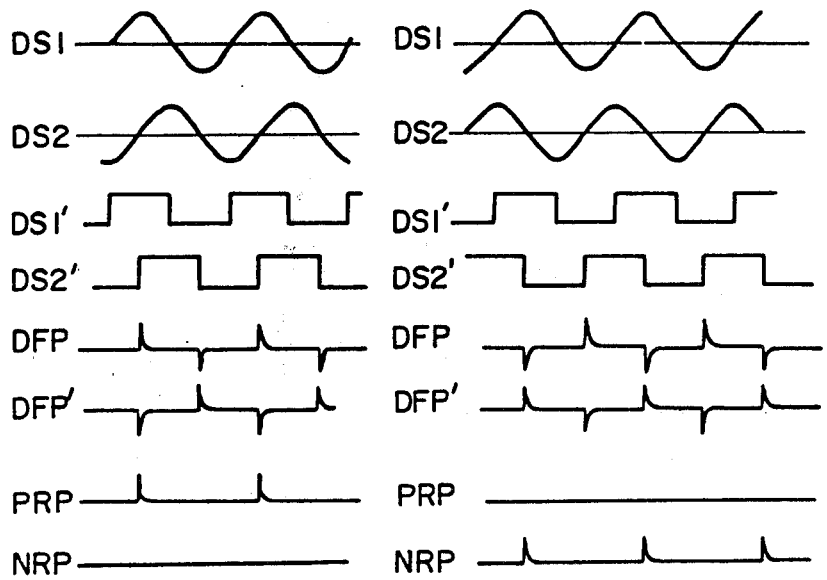

SPEED AND DIRECTION DETECTOR

BACKGROUND OF THE INVENTION

This invention relates to a speed detector, and more particularly to a speed detector which is highly suited for use in detecting the rotational speed of an induction motor.

Induction motors which are capable of being controlled in speed are now being employed to drive machine tools and other types of equipment. The speed control mechanism for an induction motor includes a variable voltage and/or variable frequency drive section which relies upon thyristors or transistors, a speed command section which issues commands that establish the desired rotational speed, a speed control circuit, a speed detector for detecting the rotational speed of the induction motor, and a speed feedback circuit which supplies the speed control circuit with a feedback signal indicative of the actual speed of the induction motor as detected by the speed detector. The speed control mechanism makes use of such an arrangement to effect automatic control of the induction motor so as to make it follow the command speed at all times.

While induction motors require little maintenance because of their simple and sturdy structure, this is not the case with the conventional speed detectors that are used to detect the speed of such motors. Specifically, the conventional speed detectors employ excitation DC-type or permanent magnet DC-type configurations having brushes and require that a considerable amount of time and labor be devoted to maintenance. Such speed detectors, when applied to the relatively maintenance-free induction motor, tend to cancel the merits of the induction motor.

SUMMARY OF THE INVENTION

Accordingly, it is an object of the present invention to provide a speed detector which does not require the use of brushes or any other contacting parts, and which, therefore, is virtually maintenance-free, the required maintenance being of a simple and readily performable nature.

It is another object of the present invention to provide a speed detector which is capable of detecting the rotational speed of a rotary machine such as an induction motor in a reliable manner through a simple and durable structure.

It is still another object of the present invention to provide a speed detector which is capable of detecting the direction in which a rotary machine, such as an induction motor, is rotating.

To this end, the speed detector in accordance with the present invention includes a circular rotational member comprising a magnetic body and having has a plurality of equally spaced-apart teeth on its outer circumference, as well as first and second magnetic sensors. Eash magnetic sensor comprises a permanent magnet, a magnetic pole which permits the passage therethrough of a flux produced by the permanent magnet, and a detection coil which is wound on a portion of the magnetic pole. The poles of the first and second magnetic sensors are disposed in close proximity to, and arranged to face, the teeth on the rotational member, and are located such that one of them is displaced circumferentially with respect to the other by an angular distance which is equivalent to ¼ of the pitch of the teeth on the rotational member.

Other features and advantages of the invention will be apparent from the following description taken in connection with the accompanying drawings.

BRIEF DESCRIPTION OF THE DRAWINGS

FIG. 4 is an embodiment of the cross-sectional view of a speed detector of the present invention;

FIGS. 5A, 5B and 5C are waveform diagrams of detection signals produced by the speed detector of the present invention;

FIG. 6 is a block diagram of circuitry for producing forward and reverse rotation signals in accordance with rotational direction; and FIGS. 7A and 7B are waveform diagrams of waveforms associated with the circuitry of FIG. 6, FIG. 7A showing waveforms for forward rotation, and FIG. 7B showing waveforms for reverse rotation.

DETAILED DESCRIPTION OF THE PREFERRED EMBODIMENT

Figure 1:
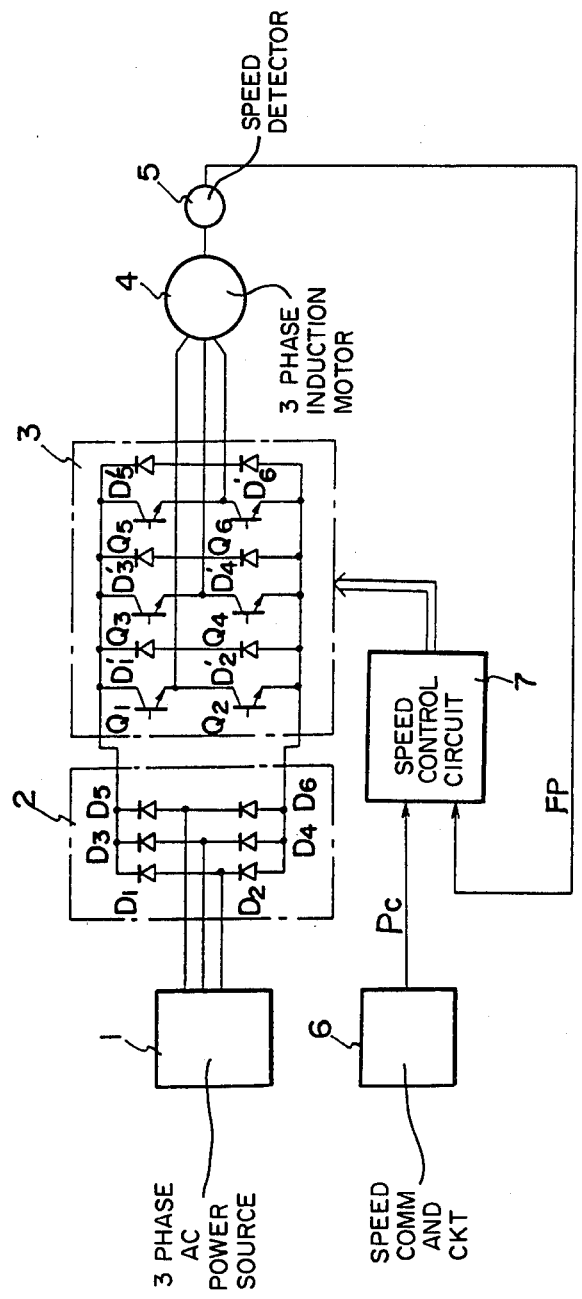
FIG. 1 is a block diagram of an induction motor speed control system to which the a speed detector of the present invention can be applied.

Illustrated in FIG. 1 is a block diagram of a speed control system for an induction motor. The system is capable of utilizing a speed detector in accordance with the present invention and includes a three-phase AC power source 1, a full-wave rectifier circuit 2, an inverter circuit 3, a three-phase induction motor 4, a speed detector 5, a speed command circuit 6 and a speed control circuit 7. The three-phase power source 1 produces sinusoidal three-phase AC voltage which is applied to the full-wave rectifier circuit 2. The rectifier comprises diodes $D_1$ through $D_6$ and full-wave rectifies the AC voltage to produce a DC voltage which is coupled to the inverter circuit 3. The inverter comprises power transistors $Q_1$ through $Q_6$ and diodes $D'_1$ through $D'_6$ and converts into three-phase AC voltage the full-wave rectified DC voltage from the full-wave rectifier circuit 2. This three-phase AC voltage has a stepped, nearly sinusoidal waveform and can be varied in frequency and effective value by controlling the on/off timing of the power transistors $Q_1$ through $Q_6$. The three-phase AC voltage from the inverter is applied to the induction motor 4 whose rotary shaft is fixedly connected to the speed detector 5, the latter generating a pulse train FP having a frequency proportional to the rotational speed n of the induction motor, that is, of the induction motor shaft. The speed command circuit 6 produces a pulse train $P_c$ whose frequency is proportional to a command speed $n_c$. The pulse train $P_c$ is applied to the speed control circuit 7 which controls the on/off timing of each power transistor in the inverter circuit 3 in accordance with the difference between the command speed $n_c$ and the actual speed n of the induction motor. Thus the speed control circuit 7 varies the frequency or the effective value of the three-phase voltage from the inverter circuit 3 in such a manner as to render the actual speed n equivalent to the command speed $n_c$.

Figure 2A:
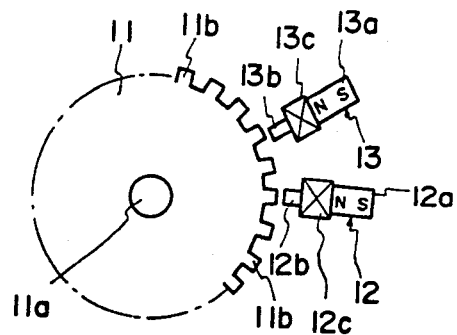
FIG. 2A and FIG. 2B are diagrams for describing the fundamentals of the speed detector of the present invention.
Figure 2B:
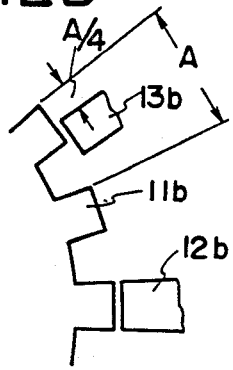
Figure 3:
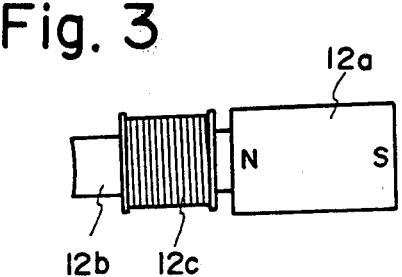
FIG. 3 is a side view of the magnetic sensor 12 of FIG. 2A.

Reference will now be had to FIGS. 2A and 2B for a description of a speed detector in accordance with the present invention, and to FIG. 3 which shows a side view of a magnetic sensor.

A circular rotational member 11 comprising a magnetic body has a hole through its center for receiving a rotary shaft 11a that provides a connection to the rotary shaft of a rotary machine such as an induction motor, and includes a plurality of equally spaced-apart teeth 11b on its outer circumference. Magnetic sensors are designated at 12 and 13 and are identical structurally. For this reason it will suffice to describe the structure of only one of the sensors. Thus, magnetic sensor 12 includes a permanent magnet 12a, a magnetic pole portion 12b, and a detection coil 12c. The magnetic pole portion 12b, which comprises a magnetic body, is attached to one end of the permanent magnet, as shown in FIG. 3, and is wound with the detection coil 12c. The magnetic pole portions 12b, 13b of the magnetic sensors 12, 13 are disposed in close proximity to the ends of the teeth 11b of the circular rotational member 11, but the sensors are arranged such that when magnetic pole portion 12b is directly opposite one of the teeth 11b, magnetic pole portion 13b is displaced by ¼ of a tooth pitch A, in the clockwise direction, from the tooth which it faces.

The speed detector of the present invention, which is shown in cross-section in FIG. 4, includes the portions illustrated in FIGS. 2 and 3. These portions are designated by the same reference numerals. The speed detector includes a yoke member 14, made of a magnetic material, which also serves as a housing. The housing and yoke member 14 is formed to include a bearing 14a which journals the rotary shaft 11a of the rotational member 11. It should be noted that a closed magnetic path is formed for the magnetic flux $\phi$ produced by the permanent magnets 12a; 13a of the magnetic sensors 12 and 13. The magnetic path is shown by the dotted line in FIG. 4 and runs from the magnetic pole portion 12b to the yoke member 14 through the tooth 11b and the rotational member 11.

In operation, the rotary shaft 11a is connected to the rotary shaft of a rotary machine such as an induction motor, so that the rotational member 11 is constrained to rotate along with the rotary machine. As the rotational member 11 rotates, a tooth 11b approaches the magnetic pole portion 12b and gradually closes the intervening gap so that the magnetic resistance of the magnetic path begins to decrease. As a result, the magnetic flux $\phi$ passing through the magnetic pole portion 12b begins to increase, so that an electromotive force e is developed across the ends of the detection coil 12c, the electromotive force being proportional to the magnitude of the change in the flux $\phi$ per unit time, and being represented by the formula $e = -d\phi/dt$. As the rotational member 11 rotates further, the area of confrontation between the tooth 11b and the magnetic pole portion 12b begins to decrease, with the result that the magnetic resistance begins to increase. Since this diminishes the magnetic flux $\phi$, there is an accompanying electromotive force, developed across the detection coil 12c as described above, which is proportional to the magnitude of the change in flux. Thus, as the rotational member 11 continues to rotate, teeth 11b pass successively by the frontal area of the magnetic pole portion 12b, with the result that an alternating first detection signal $DS_1$ is developed across the detection coil 12c. The frequency of the signal DS1, shown in FIG. 5A, is proportional to the rotational speed of the rotational member 11. Thus the first detection signal DS1 can be utilized as a speed detection signal.

The magnetic sensor 13 has the same construction as the magnetic sensor 12 so that an alternating second detection signal DS2 is developed across the detection coil 13c through entirely the same action as described above. However, since the magnetic pole portion 13b of sensor 13 is displaced by ¼ of a tooth pitch A in the clockwise direction with respect to the magnetic pole portion 12b of sensor 12, the second detection signal DS2 lags in phase by 90° behind the first detection signal DS1, produced by the magnetic sensor 12, when the rotational member 11 rotates in the clockwise direction, as best seen in FIG. 2. The phase lag can be observed in FIG. 5B which shows the second detection signal DS2. On the other hand, when the rotational member 11 rotates in the counter-clockwise direction, the second detection signal DS2 is generated as described above but now leads the first detection signal DS1 by 90°, as shown in FIG. 5C. Accordingly, a signal indicative of the direction in which the rotational member 11 rotates can be obtained by comprising the phases of the first detection signal DS1 from magnetic sensor 12 and the second detection signal DS2 from magnetic sensor 13.

Illustrated in FIG. 6 is a block diagram of a circuit for providing forward and reverse rotation pulses in accordance with the direction of rotation of the rotational member 11. The associated waveforms are depicted in FIG. 7, wherein FIG. 7A shows waveforms for forward rotation, and FIG. 7B shows waveforms for reverse rotation.

In FIG. 6, waveform shaping circuits 21, 22, such as Schmitt trigger circuits, produce first and second square wave signals DS1', DS2' upon receiving the alternating first and second detection signals DS1, DS2. A differentiation circuit 23 differentiates the second square wave signal DS2' and delivers the differentiated signal DFP to a polarity reversing circuit 24 that reverses the polarity of the signal, and to an AND gate 25. The AND gate 25 and an AND gate 26 are opened by the first square wave signal DS1' which is the output of the shaping circuit 21. The AND gate 25 delivers forward rotation pulses PRP, and the AND gate 26 delivers reverse rotation pulses NRP.

In a case where the phase of the first detection signal DS1 leads the phase of the second detection signal DS2 (forward rotation), the polarity of the differentiated signal DFP is positive when DS1' is at logical "1". Therefore the AND gate 25 delivers a positive differentiated pulse from the differentiated signal in the form of the forward rotation pulse PRP. On the other hand, when the phase of the first detection signal DS1 lags behind that of the second detection signal DS2 (reverse rotation), the polarity of the inverted differentiated signal DFP', obtained from the polarity reversing circuit 24, is positive when DS1' is at logical "1". Therefore the AND gate 26 delivers a positive differentiated pulse from the inverted differentiated signal in the form of the reverse rotation pulse NRP.

In accordance with the present invention as described above, therefore, it is possible to provide a speed detector which does not include contacting parts such as brushes, the speed detector utilizing magnetic sensors which are simple in construction. The speed detector requires little maintenance, therefore, as is the case with an induction motor. Moreover, the direction of rotation of a rotary machine can be detected with facility by means of signals from the magnetic sensors, two of which are provided but one of which is disposed so as to be displaced in the clockwise direction by ¼ of a tooth pitch.

As many apparently widely different embodiments of the present invention can be made without departing from the spirit and scope thereof, it is to be understood that the invention is not limited to the specific embodiment thereof except as defined in the appended claims.

What we claim is:

1. A speed and direction detector for detecting the rotational speed and the rotational direction of a rotary machine, comprising:
   a circular rotational member having a plurality of equally speced-apart teeth on the outer circumference thereof;
   first and second magnetic sensors positioned in such a manner that said first magnetic sensor is located at a position displaced circumferentially from one of said equally spaced-apart teeth of said circular rotational member by an angular distance equivalent to ¼ of the pitch of said equally spaced-apart teeth when said second magnetic sensor is directly opposite one of said equally spaced-apart teeth;
   a rotational direction discriminating circuit operatively connected to said first and second magnetic sensors; and
   a housing including a yoke member to which said first and second magnetic sensors are fixedly secured;
   said first and second magnetic sensors each comprising:
      a permanent magnet secured fixedly to the yoke member of the housing;
      a magnetic pole extending from said permanent magnet and positioned so as to face the equally spaced-apart teeth on said circular rotational member; and
      a detection coil wound upon said magnetic pole, said permanent magnet, said magnetic pole, said equally spaced-apart teeth on said circular rotational member, the body of said rotational member and said housing forming a magnetic path.

2. A speed detector for detecting the speed of a rotating shaft, comprising:
   a circular rotation member having teeth equidistantly positioned on the outer circumference thereof, said circular rotation member driven in response to the rotating shaft;
   a housing defining an inner volume for containing said circular rotation member;
   a first magnetic sensor, comprising:
      a first permanent magnet, fixedly secured to said housing and extending from said housing into the inner volume, for generating magnetic flux;
      a first magnetic pole, extending from said first permanent magnet so as to be disposed opposite said teeth at the periphery of said circular rotation member, said first magnetic pole permitting the passage therethrough of the flux generated by said first permanent magnet;
      a first detection coil wound around said first magnetic pole; and
   a second magnetic sensor, comprising:
      a second permanent magnet, fixedly secured to said housing and extending from said housing into the inner volume, for generating magnetic flux;
      a second magnetic pole, extending from said second permanent magnet so as to be disposed opposite said teeth at the periphery of said circular rotation member, said second magnetic pole permitting the passage therethrough of the flux generated by said second permanent magnet, said second magnetic pole positioned so that when said first magnetic pole is opposite one of the teeth said second magnetic pole is displaced circumferentially from another of the teeth of said circular rotation member by an arc equivalent to ¼ of the pitch of the equidistantly spaced teeth; and
      a second detection coil wound around said second magnetic pole,
   said housing, said first and second permanent magnets, said first and second magnetic poles, said teeth of said circular rotation member, and the main body of said circular rotation member forming magnetic paths for the magnetic flux generated by said first and second permanent magnets.

3. A speed detector set forth in claim 2, wherein said first detection coil generates a first detection signal and wherein said second detection coil generates a second detection signal, said speed detector further comprising:
   a first waveform shaping circuit, coupled to said first detection coil, for receiving said first detection signal and for generating a first square wave signal;
   a second waveform shaping circuit, coupled to said second detection coil, for receiving said second detection signal and for generating a second square wave signal;
   a differentiation circuit, operatively connected to said waveform shaping circuit for receiving said second square wave signal and for generating a differentiation signal;
   a polarity reversing circuit, operatively connected to said differentiation circuit, for receiving said differentiation signal and for generating an inverted differentiation signal;
   a first AND gate, operatively connected to said first waveform shaping circuit and said differentiation circuit, for generating, as an output, a forward rotation pulse signal in dependence upon said first square wave signal and said differentiation signal; and
   a second AND gate, operatively connected to said first waveform shaping circuit and said polarity reversing circuit, for generating, as an output, a reverse rotation pulse signal in dependence upon said first square wave signal and said inverted differentiation signal.

4. The speed detector as set forth in claim 3, wherein said first and second wave form shaping circuits are Schmitt trigger circuits.

* * * * *

UNITED STATES PATENT AND TRADEMARK OFFICE
CERTIFICATE OF CORRECTION

PATENT NO.   :   4,370,614
DATED        :   JANUARY 25, 1983
INVENTOR(S)  :   SHIGEKI KAWADA ET AL.

It is certified that error appears in the above-identified patent and that said Letters Patent is hereby corrected as shown below:

```
Col. 2, line  9, delete "a";
        line 16, "is an embodiment of the" should be --a--;
        line 17, "a" should be --an embodiment of the--.
Col. 3, line 36, "12a, 13a" should be --12a and 13a--.
Col. 4, line 19, after "but" insert --it--;
        line 22, "comprising" should be --comparing--;
        line 35, "DS1', DS2'" should be --DS1' and DS2'--;
        line 36, "DS1, DS2" should be --DS1 and DS2--.
Col. 5, line 15, "speced-apart" should be --spaced-apart--.
```

Signed and Sealed this

Fifth Day of July 1983

[SEAL]

Attest:

Attesting Officer

GERALD J. MOSSINGHOFF

Commissioner of Patents and Trademarks